United States Patent [19]

Wenzel

[11] Patent Number: 4,772,246

[45] Date of Patent: Sep. 20, 1988

[54] DOWNHOLE MOTOR DRIVE SHAFT UNIVERSAL JOINT ASSEMBLY

[76] Inventor: Kenneth H. Wenzel, 3668-93 Street, Edmonton, Alberta, Canada, T6E 5N3

[21] Appl. No.: 935,847

[22] Filed: Nov. 28, 1986

[30] Foreign Application Priority Data

Oct. 11, 1986 [CA] Canada .................... 522,636

[51] Int. Cl.[4] .......................................... F16D 3/50
[52] U.S. Cl. .................... 464/117; 464/133; 464/152; 464/155
[58] Field of Search ............... 175/92, 101, 107, 317, 175/324; 277/173, 176, 212 FB; 418/48; 464/106, 112, 114, 117, 133, 136, 139, 140, 141, 147, 150, 152, 155, 156

[56] References Cited

U.S. PATENT DOCUMENTS

| | | | |
|---|---|---|---|
| 1,582,997 | 5/1926 | McGee | 464/114 |
| 3,044,280 | 7/1962 | Haneklaus | 464/156 |
| 3,112,801 | 12/1963 | Clark et al. | 175/107 |
| 3,673,814 | 7/1972 | Carman | 464/156 |
| 3,729,953 | 5/1973 | Wanzer | 464/152 |
| 3,731,500 | 5/1973 | Schlums | 464/152 X |
| 3,964,558 | 6/1976 | Fogle | 175/107 |
| 4,232,751 | 11/1980 | Trzeciak | 175/101 |
| 4,295,535 | 10/1981 | Crase et al. | 175/101 |
| 4,493,676 | 1/1985 | Krude | 464/141 |

FOREIGN PATENT DOCUMENTS

| | | | |
|---|---|---|---|
| 1911397 | 9/1970 | Fed. Rep. of Germany | 464/152 |
| 1135509 | 1/1985 | U.S.S.R. | 464/117 |

Primary Examiner—Daniel P. Stodola
Attorney, Agent, or Firm—Hayes, Davis & Soloway

[57] ABSTRACT

A universal joint assembly comprises a first rotary member having a first longitudinal axis and an outer tubular portion at one end thereof concentrically disposed about the axis, a second rotary member having a second longitudinal axis and an inner tubular portion at one end thereof concentrically disposed about the axis, the second member being adapted to be telescopically received within the outer tubular end portion of the first member, a ball bearing for transmitting axial loads between the first and second members, the bearing pivotally connecting the first and second members whereby to provide limited omni-directional pivotal movement of one of the first and second members with respect to the other of the first and second members about a point of intersection of the longitudinal axes of the first and second members, and a slot and key engagement disposed between the outer and inner tubular end portions for transferring torque between the first and second members, the longitudinal slots formed in one of the tubular end portions and keys extending from the other of the tubular end portion into torque transfer relation with the slots.

8 Claims, 4 Drawing Sheets

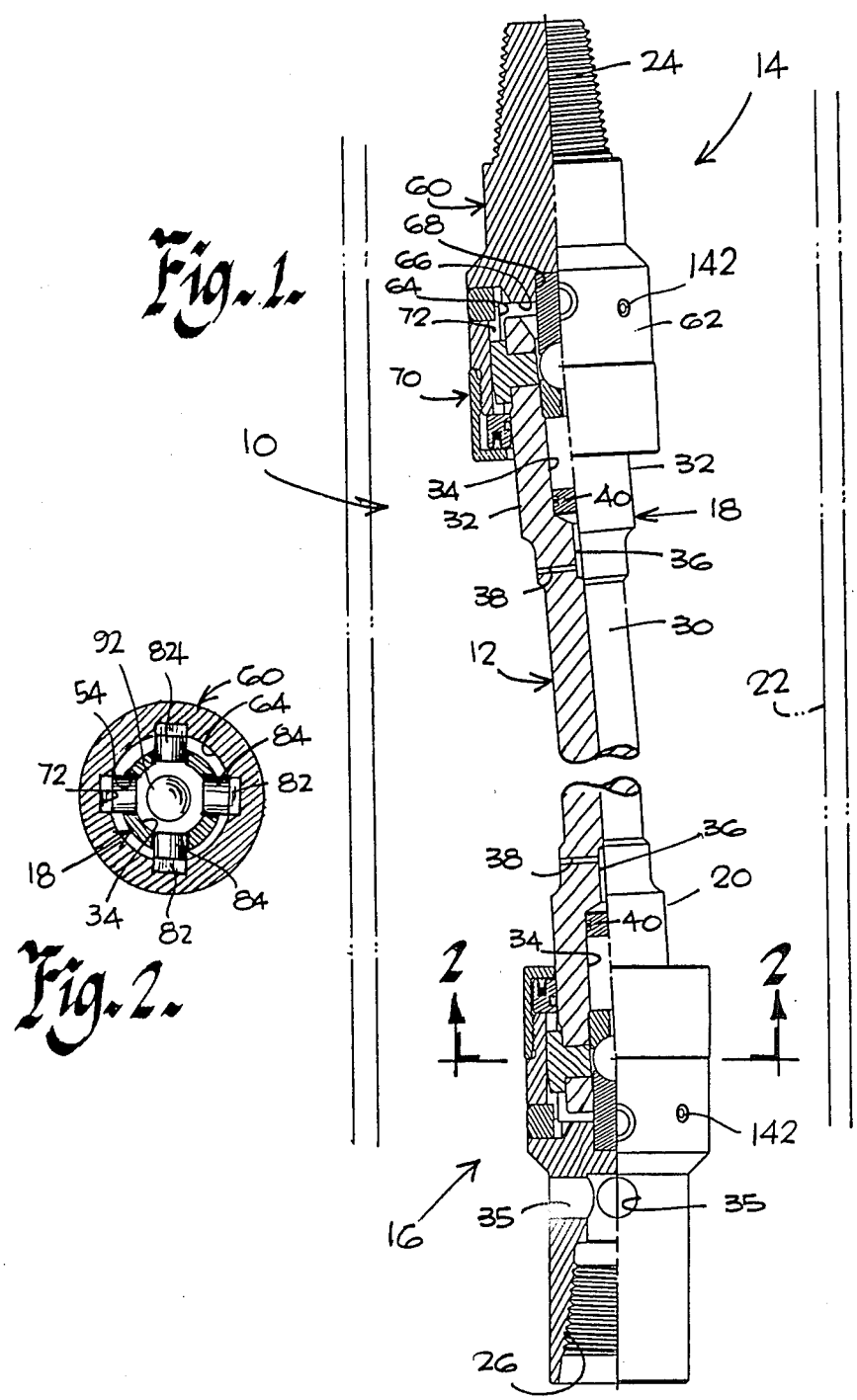

DOWNHOLE MOTOR DRIVE SHAFT UNIVERSAL JOINT ASSEMBLY

The present invention generally relates to a drive shaft for use with downhole motors employed in earth drilling operations and, more specifically, to a universal joint assembly for such drive shaft.

BACKGROUND OF THE INVENTION

The rotary output member or rotor of conventional downhole positive displacement motors employed in earth drilling operations are eccentric, by an amount in the order of approximately ⅜ of an inch, with respect to the axis of the drill string and the input member of a bearing assembly to which the rotor must be secured. Accordingly, a drive shaft having universal joints at each end is commonly employed to connect the output member of the motor to the input member of the bearing assembly.

The necessary universal joint arrangement typically employed heretofore is comprised of a pair of tubular members having inter-locking axially extending teeth which transfer of torque between the tubular members while the members are disposed at an angle to one another. A ball and seat arrangement, located in the interior of the universal joint assembly, serves to maintain the tubular members operatively engaged.

The ball and seat and the inter-locking teeth must be kept free of drilling mud for proper operation and optimum life expectancy of the universal joint assemblies. To that end, a flexible sleeve is typically placed over each universal joint assembly so as to seal the joints from the drilling fluid. The sleeve encased universal joints are filled with lubricating fluid under appropriate pressure. This form of sleeve is preferred because it is relatively inexpensive and easily serviceable.

There is a major drawback to the above described universal joint assembly. For whatever reason, there is a tendency for the flexible sleeve to become caught between and torn by the teeth of the tubular universal joint members. This will allow drilling mud to enter the universal joint assembly and, as explained earlier, may result in premature failure of the universal joint assembly. Because of the nature of the conventional joint construction, it is difficult to employ any other form of relatively inexpensive and easily serviceable seal arrangement. There is seen to be a need, therefore, for an alternative form of universal joint assembly which can be used with the conventional sleeve seal arrangement or which will permit the use of other forms of sealing arrangements.

At least in part, the difficulty described above is thought to result from pressure fluctuations of the drilling mud which forces the sleeve into the teeth of the universal joint. Clearly, regardless of the type of seal employed, such pressure fluctuations may adversely affect the operation of the sleeves.

SUMMARY OF THE INVENTION

The present invention seeks to provide a universal joint assembly which not only allows the use of conventional sleeve-type seals without the risk of the sleeve being pinched or torn by components of the joint assembly but also allows the use of other types of conventional shaft seals. The present invention also seeks to provide a universal joint assembly which at least minimizes, if not eliminates, the adverse effects of drilling fluid pressure fluctuations.

In accordance with the invention, there is provided a universal joint assembly comprising a first rotary member having a longitudinal axis and an outer tubular portion at one end thereof concentrically disposed about the axis, a second rotary member having a longitudinal axis and an inner tubular portion at one end thereof concentrically disposed about the axis, the second member being adapted to be telescopically received within the outer tubular end portion of the first member, means pivotally connecting the first and second members whereby to provide limited omnidirectional pivotal movement of one of the first and second members with respect to the other of the first and second members about a point of intersection of the longitudinal axes of the first and second members, and torque transfer means disposed between the outer and inner tubular end portions for transferring torque between the first and second members. The torque transfer means includes longitudinal slot means formed in one of the tubular end portions and key means extending from the other of the tubular end portions into torque transfer relation with the slot means.

BRIEF DESCRIPTION OF THE DRAWINGS

These and other features of the invention will become more apparent from the following description in which reference is made to the appended drawings, wherein:

FIG. 1 is a broken, longitudinal elevational view, partially in cross-section, of the preferred embodiment of the drive shaft assembly of the present invention;

FIG. 2 is a transverse cross-sectional view taken along line 2—2 of FIG. 1;

DETAILED DESCRIPTION OF PREFERRED EMBODIMENT

Figure 3:
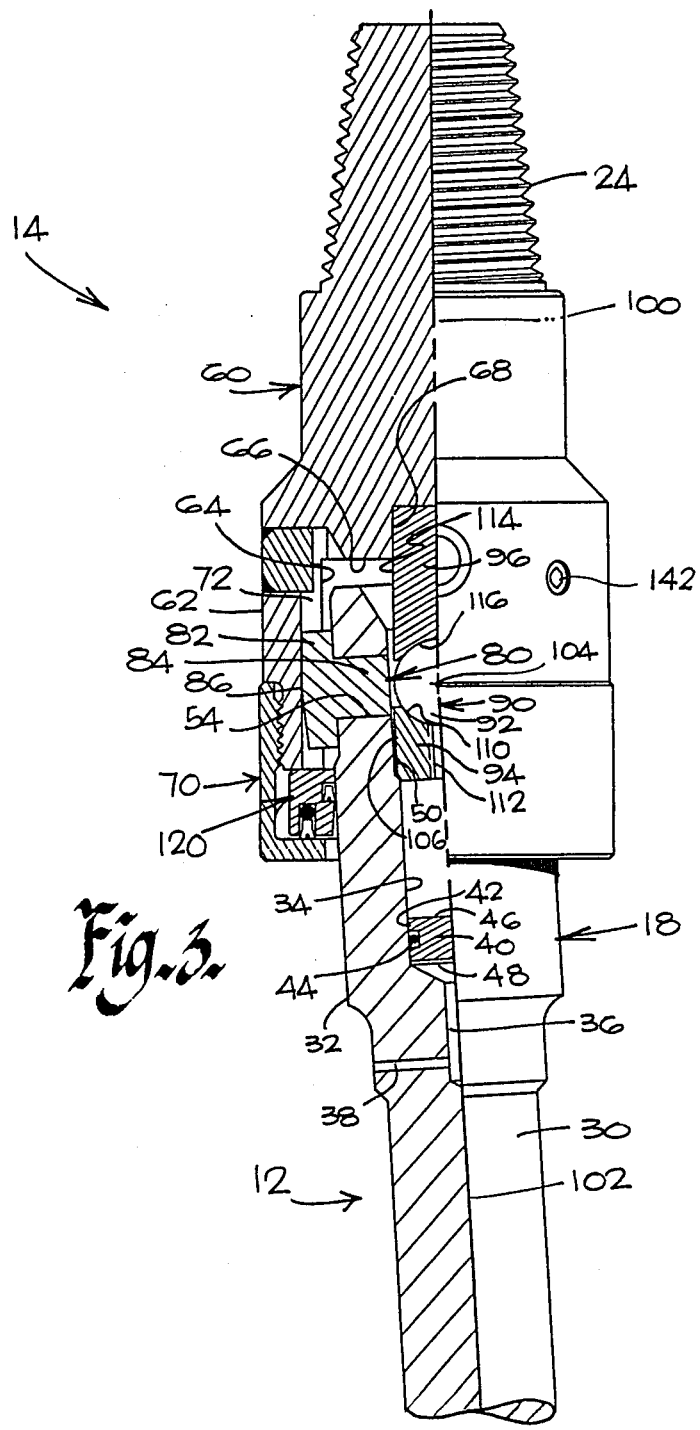
FIG. 3 is an enlarged elevational view, partially in cross-section, of a universal joint assembly according to the preferred embodiment of the present invention.

The drive shaft assembly of the present invention, generally designated by reference numeral 10, is generally comprised of a drive shaft 12 and universal joint assemblies 14 and 16 of which opposed end portions 18 and 20 of the drive shaft form a part. Universal joint assembly 14 is arranged to be secured to the output member (not shown) of a conventional downhole motor (not shown) while universal joint assembly 16 is arranged to be secured to the input member (not shown) of a conventional bearing assembly. The axis of the output member of the motor is parallel to both that of the drill string and the input member of the bearing assembly but displaced therefrom by an amount in the order of ⅜ of an inch.

As is well known, the downhole motor is disposed in a drill casing, shown in dotted-and-dashed lines in FIG. 1 and designated by reference numeral 22, through which drilling fluid or mud is pumped under pressure down to a rotary drill bit at the bottom of the borehole. The fluid flushes cuttings and chips away from the drill bit and carries them to the surface. As explained earlier, the presence of drilling fluid or mud on the exterior of conventional drive shaft universal joints places considerable pressure upon conventional universal joint seals and causes premature failure of the seals and ultimately the universal joint assemblies themselves.

The two universal joint assemblies 14 and 16 are of substantially the same construction except that assembly 14 is formed with a threaded pin 24 which is threaded into the threaded bit end (not shown) of the output member of the downhole motor while assembly 16 is formed with a threaded hole 26 which receives a tubular, externally threaded pin end (not shown) of the input member of the bearing assembly. As is well known, the bearing assembly is formed with a central longitudinal passage (not shown) for conveying drilling mud to the drill bit. To that end, coupling member 36 of universal joint assembly 16 is additionally provided with a plurality of radial passages 35 to communicate drilling mud from the exterior of assembly 16 to threaded hole 26 as best shown in FIG. 1.

The construction of universal joint assembly 14 will now be described with reference to FIGS. 2 and 3. While assembly 16 is not described in detail, it is to be understood, as already mentioned, that the description of assembly 14 is equally applicable to assembly 16.

Drive shaft 12 is formed with a solid, cylindrical, central body portion 30 and concentrically disposed tubular end portions 18 and 20. Tubular end portions 18 and 20 are each formed with a tubular wall defined by a cylindrical outer surface 32 and a concentric inner surface or blind bore 34. Bore 34 defines a pressure equalizing chamber for equalizing the pressure between the exterior of universal joint assembly 14 and the lubricant packed interior thereof as will become clearer later. Body portion 30 is formed with longitudinal and radial bleed passages 36 and 38, respectively, for communicating drilling mud from the exterior of the assembly 14 to the inner end of bore 34.

As shown in FIG. 1, a slide seal 40 is slidingly disposed in bore 34 and includes an outer cylindrical surface 42, having an O-ring seal 44 disposed therein, and opposed faces 46 and 48.

The outer end of bore 34 is formed with an enlarged diameter bore portion 50 which, with bore 34, forms a shoulder 52. As explained later, bore portion 50 is arranged to receive a seat member and shoulder 52 serves as a stop or seat for the seat member. Four radial bores 54, spaced apart at equal angular intervals of 90 degrees, are formed in enlarged diameter portion 50 to receive the shank portion of associated key members described later.

Assembly 14 further includes a coupling member generally designated by reference numeral 60. One end of coupling member 60 is formed with aforementioned threaded pin end 24. The other end of coupling member 60 is formed with a tubular wall defined by an outer cylindrical surface 62 and a concentric inner cylindrical surface or blind bore 64. The inner end of bore 64 terminates in a circular end wall 66 in which is formed a second concentric blind bore 68 arranged to receive a second seat member as explained later. The end of outer surface 62 of coupling member 60 is concentrically stepped inwardly and threaded to receive a seal retaining nut generally designated by reference numeral 70.

Bore 64 of coupling member 60 is formed with four longitudinally extending slots 72 spaced apart at equal angular intervals of 90 degrees. As best shown in FIG. 2, each of slots 72 is formed with a longitudinally extending planar bottom surface 74 and opposed planar side surfaces 76.

Four key members, generally designated by reference numeral 80, serve to transfer torque between coupling member 60 and shaft 12 as explained hereinbelow. Each key member 80 is formed with a generally parallelepiped head portion 82 and a cylindrical shank portion 84. Shank portion 84 is arranged to be received in sliding fit relation in an associated radial bore 54 in tubular end portion 18 of shaft 12 and provides the key member with the freedom of pivotal movement about a radial axis as required when shaft 12 pivots with respect to the coupling member 60 in a plane which is transverse to the plane of the paper in FIGS. 1 and 3. Head portion 82 is elongated and extends transversely of shank 84 and formed with an end surface 86 remote from shank 84 and opposed planar side surfaces 88. The width of head portion 82 is arranged to be received in slots 72 in a snug fit relation with opposed planar side surfaces 88 in juxtaposition with planar side surfaces 76 of slots 72. End surface 86 is arcuate in side view and centered on the axis of coupling member 60 to permit the necessary longitudinal movement of head portion 86 in slot 72 as required when coupling member 60 and shaft 12 rotate during operation. More specifically, during operation and by virtue of the angular relationship between coupling member 60 and shaft 12, key members 80 will pivotally oscillate about an axis extending transversely of both the axis of the coupling and the axis of shanks 84 as well as about the axis of shanks 84 and head portions 82 will linearly oscillate longitudinally within slots 72, as already mentioned.

Tubular end portion 18 of shaft 12 must be capable of limited omni-directional pivotal movement with respect to coupling member 60 about a point on the axis of coupling member 60. To that end, there is provided a bearing assembly 90 comprised of a ball 92 and seat members 94 and 96. The centre of ball 92 is located at the point of intersection 104 of axis 100 of the coupling member and axis 102 of the drive shaft.

Seat member 94 is formed with an outer cylindrical surface 106 which is received in close fit relation in enlarged diameter portion 50 of bore 34 and a shoulder 108 which is seated against shoulder 52 for locating the seat member in enlarged diameter portion 50. Seat member 94 is also formed which a concave spherical seat 110 which receives the convex spherical surface of ball 92. A concentric threaded hole 112 is formed in seat member 94 for both facilitating removal of the seat member and communicating lubricating fluid to bore 34 and face 46 of sliding seal 40.

Seat member 96 is formed with a cylindrical outer surface 114, a part of which is received in close fit relation in bore 68 and extends toward seat 94 in coaxial relation thereto, as shown. As with seat member 94, seat member 96 is formed with a concave spherical seat 116 for mating engagement with the convex spherical surface of ball 92. Shaft 12 is maintained under compression during operation so that ball 92 is also under compression between seats 110 and 116 of members 94 and 96, respectively.

Figure 4:
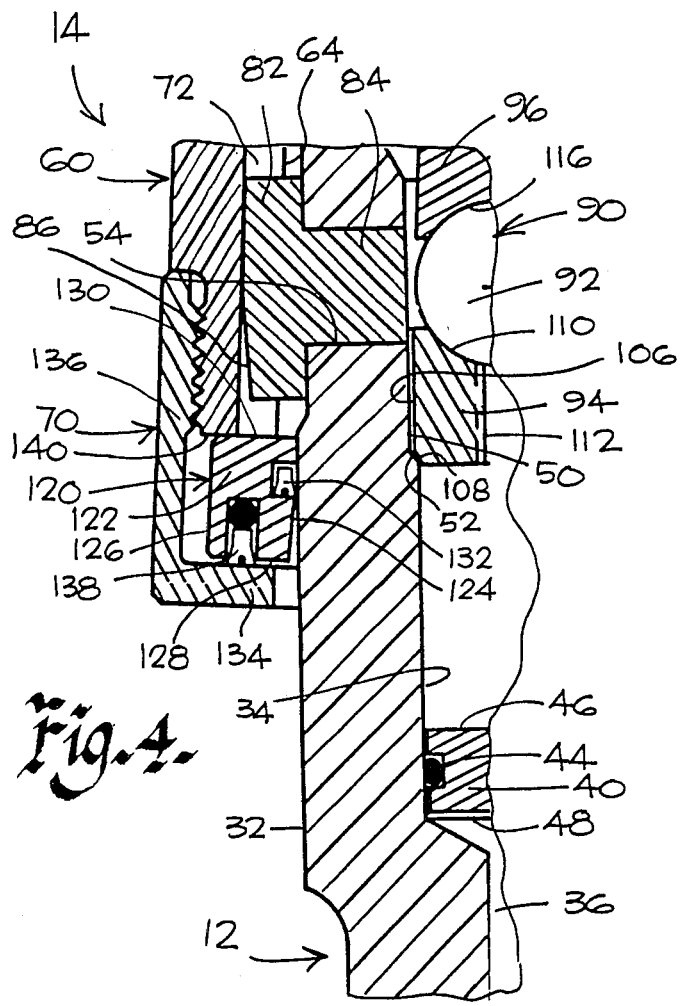
FIG. 4 is an enlarged, broken, cross-sectional view illustrating the sealing assembly of FIGS. 1 and 3.

With particular reference to FIG. 4, a seal, generally designated by reference numeral 120, provides a fluid seal between the interior and exterior of the universal joint assembly. Seal 120 is in the form of a ring member 122 having inner and outer cylindrical surfaces 124 and 126, respectively, and opposed annular end faces 128 and 130, respectively. A suitable seal member 132 is disposed in inner surface 124 to provide a fluid seal between outer surface 32 of the tubular end portion 18 of the shaft and the ring member. Retaining nut 70 is cup-shaped with an annular flange 134 depending radially inwardly from the tubular body portion 136 thereof. A seal member 138 is disposed in annular end 128 of the ring member and provides a fluid seal when compressed between the ring member and flange 132 of retaining nut 70 by threading of retaining nut onto coupling member 60. In so doing, it will be seen that annular surface 130 of ring member 122 is urged against the end 140 of coupling member 60.

OPERATION

Prior to use, the universal joint assembly is assembled in the manner described earlier and is then packed to a suitable pressure with lubricating fluid via nipple 142. This urges ring member 122 against flange 134 and thereby further compresses seal member 138, thus preventing leakage from therebetween while seal member 132 prevents leakage from between outer surface 32 of shaft 12 and the ring member. The pressurized lubricating fluid is also communicated to bore 34 and against face 46 of sliding seal member 40 and urges the latter to its innermost position shown in FIGS. 1 and 3.

When the universal joint assembly is installed in the drill string and subjected to the high pressure of drilling mud, drilling fluid passes through passages 38 and 36 and to the inner end of bore 34. The initially higher drilling fluid pressure is communicated to end face 48 of seal 40 and urges it toward the enlarged diameter end portion 50 of the bore until the pressure on end faces 46 and 48 of the sliding seal is equalized. Any variation in pressure on the exterior of the universal joint assembly is in like manner communicated to the sliding seal and, thus, the pressure of the lubricating fluid in the universal joint assembly is maintained at the same pressure as the drilling fluid so that the likelihood of leakage of lubricating fluid is minimized as is the likelihood of leakage of drilling mud into the universal joint assembly.

Rotation of the rotor of the downhole motor causes rotation of coupling member 60. Torque is transmitted to tubular end portion 18 of the drive shaft by virtue of the abutting engagement of the side wall of slots 72 and the planar side surfaces of the head portion of the key members and the engagement of the shank portion of the key members within their respective mating bores in the drive shaft. The angular disposition of the drive shaft with respect to the coupling member will be accommodated, during rotation of the assembly, by substantially linear cyclical oscillation of the head portions of the key members within the slots of the coupling member, caused by angular displacement of the aixs of the key members in a plane containing the axis of the coupling member about the centre of the ball, and corresponding pivotal oscillation of the shank portion of the key members within their respective bores in the drive shaft.

It will be seen that the above described universal joint assembly overcomes the disadvantages of the prior art universal joint assembly discussed earlier. First, the seal cannot become caught between the moveable members of the joint. Second, by virtue of sliding seal 40, joint interior and exterior pressures are equalized so that the seal need not handle large pressure differentials during operation and, accordingly, there will be little tendency for leakage of lubricating fluid to the exterior or drilling mud to the interior of the joint assembly. In addition, the seals are readily serviceable.

Figure 5:
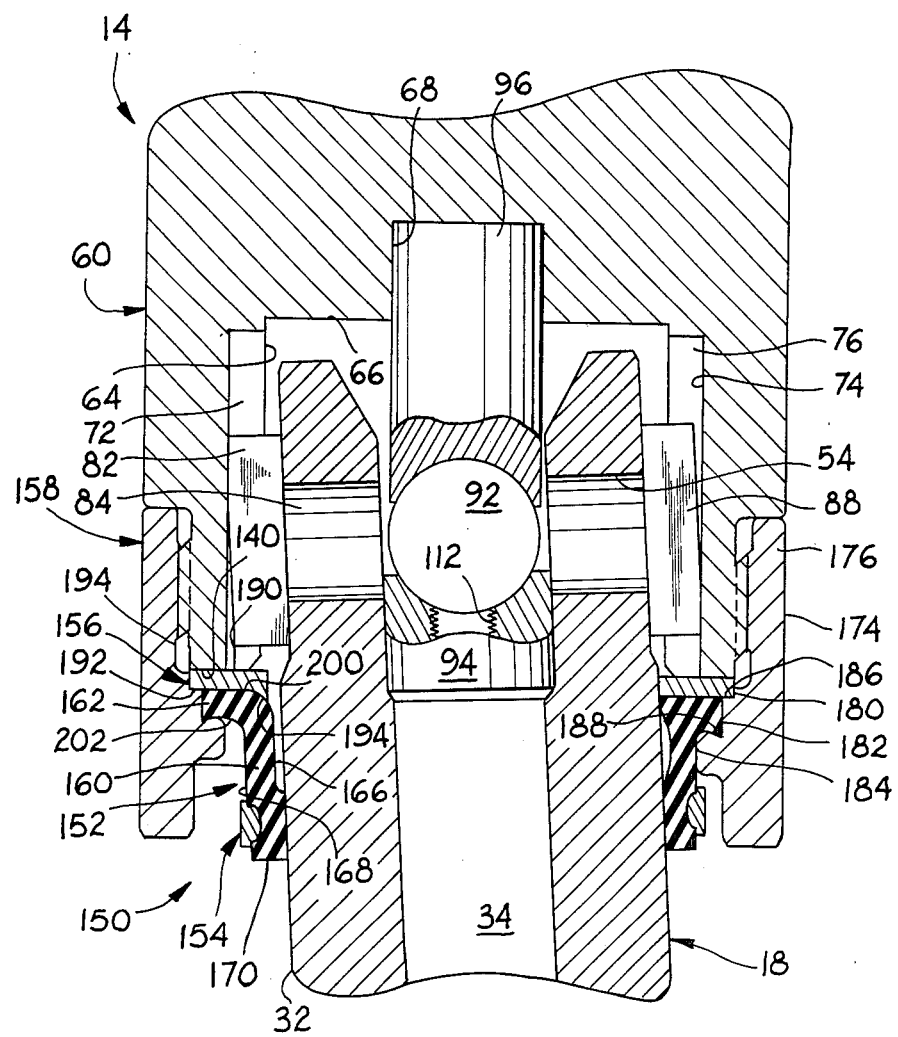
FIG. 5 is an enlarged cross-sectional elevational view, similar to FIG. 3, illustrating an alternative sealing arrangement.

FIG. 5 illustrates an alternative seal arrangement, generally designated by reference numeral 150, operatively disposed in a universal joint assembly which is identical to assembly 14 in the embodiment of FIG. 1-4. Accordingly, like components have been designated with like reference numerals in the following description.

Seal assembly 150 is comprised of four components, namely, a flexible seal member 152, a ring clamp 154, a seal bearing ring 156 and a retaining nut 158.

Flexible seal member 152 is formed of rubber or like flexible material and includes a tubular body portion 160 and a flange portion 162 extending radially outwardly of one end 164 of the body portion. Body 160 includes a generally cylindrical inner surface 166 and an outer surface 168. Clamp 154, of conventional construction, is arranged to clampingly engage outer surface 168 of the other end 170 of member 152 so as to urge inner surface 166 into sealing engagement with outer surface 32 of tubular end portion 18 of the drive shaft as shown. Flange 162 is arranged to be sealingly clamped between bearing ring 156 and retaining nut 158 as explained hereinbelow.

Retaining nut 158 is tubular and comprises an external cylindrical surface 174 whose diameter is the same as that of the coupling member so as to provide a uniform outer surface. One end 176 of the nut is internally threaded for engagement with the externally threaded end of coupling member 60 as shown. The nut is formed with three internal cylindrical surfaces 180, 182 and 184, respectively, defining first and second shoulders 186 and 188, respectively. As shown in FIG. 5, shoulder 188 is generally conical in shape and defines an acute angle with surface 182.

Bearing ring 156 is formed with a first annular surface 190 which abuttingly engages end 140 of the coupling member and a second annular surface 192 which abuttingly engages shoulder 186 of nut 158 so that the ring can be securely clamped between the end of the coupling member and the retaining nut when the nut is threaded onto the coupling member, as shown. The outer edge 194 of ring 156 is received within surface 180 of the nut while the inner edge of the ring is spaced from surface 32 of the drive shaft to permit the aforedescribed pivotal movement of the drive shaft and coupling member. The inner end of surface 192 is formed with an axially flared portion defining a shoulder 194 for engagement with a similarly shaped portion of the sleeve at the junction of the tubular and flange portions of the sleeve so as to minimize any tendency of the flange moving inwardly, out of clamping relation from between the bearing ring and retaining nut.

Flange 162 is formed with a first annular surface 200 which sealingly engages second surface 192 of the bearing ring and a second generally annular surface 202 which sealingly engages second shoulder 188 of the retaining unit, as shown. The thickness of the flange is greater than the spacing between surface 192 of the bearing ring and shoulder 188 when the nut is fully threaded onto the coupling member. The outer end of surface 202 is conical in shape for matingly engaging conical shoulder 188 of the retaining nut whereby to enhance the clamping relationship between the nut and flange and further minimize any tendency for the flange working free of the nut and bearing ring during operation. The retaining nut is formed with an axial extension 194 remote from the threaded end portion for physically protecting the sleeve.

When the universal joint assembly is packed with lubricating fluid, fluid will tend to flow between the sleeve and the tubular end portion 18 of the drive shaft so as to thereby enhance the sealing relationship between the flange, nut and bearing ring.

It will be apparent to one skilled in the art that in order to be functional universal joint assemblies 14 and 16 must be capable of transferring torque and axial loads between drive shaft 12 and coupling member 60 while still permitting limited omni-directional pivotal movement of coupling members 60 relative to drive shaft 12. In order to ensure an adequate description of this aspect of the invention, the torque and axial load transfer will hereinafter be further described.

Torque is transferred between drive shaft 12 and coupling members 60 by a plurality of keys 80 extending from tubular end portions 18 and 20 of drive shaft 12 into longitudinal slots 72 in the inner surface 64 of coupling members 60. In order to permit the necessary omni-directional pivotal movement of coupling members 60 relative to drive shaft 12, keys 80 are uniquely mounted. Shank portions 84 of keys 80 are received in bores 54 in tubular end portions 18 and 20 of drive shaft 12 such that each of keys 80 is capable of limited rotational movement about axis 101 of shank portion 84. This permits shank portion 84 to rotate in bore 54 when a force is exerted which is transverse to longitudinal slots 72. In the absence of this rotational movement keys 80 would bind in slots 72. The movement of shank portion 84 can be more accurately described as an oscillation as shank portion 84 rotates first in one direction and then in the opposed direction. Keys 80, also have an elongated head portion 82 which extends transversely of shank portion 84. Each head portion 82 has an arcuate end surface 86 which is centred upon a bottom surface 74 of an associated slot 72. When key member 80 is subjected to a force which is parallel to slots 72, head portion 82 of keys 80 rock and slide along slots 72.

Axial loads are transmitted between drive shaft 12 and coupling members 60 by a ball 92 positioned between seat members 94 and 96. It is important to have the axial force exerted on the centre of ball 92, for otherwise ball 92 could become wedged resulting in extreme radial loading. The centring of the ball is accomplished by having seat member 94 centered on longitudinal axis 102 of drive shaft 12 and seat member 96 centered on longitudinal axis 100 of coupling members 60. When ball 92 is positioned as described at the intersection of longitudinal axes 100 and 102, the necessary omni-directional pivotal movement of coupling members 60 relative to drive shaft 12 may occur.

In order to ensure that the omni-directional pivotal movement of ball 92 is parallel and compatible with the movement of keys 80, the axes 101 of shank portions 84 of keys 80 must be centered on center 104 of ball 92. When this occurs the displacement of the axes 101 of shank portions 84 of keys 80 is minimized.

The embodiments of the invention in which an exclusive property of privilege is claimed are defined as follows:

1. A universal joint assembly, comprising:
   a first rotary member having a first longitudinal axis and an outer tubular portion at one end thereof concentrically disposed about said axis;
   a second rotary member having a second longitudinal axis and an inner tubular portion at one end thereof concentrically disposed about said axis, said second member being adapted to be telescopically received within said outer tubular end portion of said first member;
   each said tubular end portion comprising a tubular wall defining an outer cylindrical surface and a concentric inner cylindrical surface;
   torque transfer means disposed between said outer and inner tubular end portion for transferring torque between said first and second members, said torque transfer means pivotally connecting said first and second members to provide limited omni-directional pivotal movement of one of said first and second members with respect to the other of said first and second members about a point of intersection of the longitudinal axes of said first and second members, said torque transfer means including a plurality of equally angularly spaced longitudinal slots in said inner cylindrical surface of said outer tubular end portion of said first member, each said slot having a bottom surface and opposed side surfaces, and keys extending from said inner tubular end portion into torque transfer relation with said slots, said keys being secured to said inner tubular end portion for pivotal movements about radial axes, each said key having a cylindrical shank portion adapted to be received in a radial bore in said inner tubular end portion and an elongated head portion extending transversely of said shank portion, each said head portion having a width which is substantially the same as that of said slots, said keys corresponding in number to the number of said slots and extending radially outwardly from said outer cylindrical surface of said inner tubular end portion of said second member, each said head portions having an arcuate surface remote from said shank portion arranged to be juxtaposed adjacent said bottom surface of an associated slot and opposed side surfaces abuttingly engageable in torque transfer relation with said opposed side surfaces of said associated slot, said head portion of each said key being longitudinally moveable in said associated slot in response to pivotal movement of said first and second members and said keys being operable to transfer torque between said first and second members; and
   bearing means for transmitting axial loads between said first and second members, said bearing means pivotally connecting said first and second members to provide limited omni-directional pivotal movement of one of said first and second members with respect to the other of said first and second members about a point of intersection of the longitudinal axes of said first and second members, said bearing means comprising a first concave spherical seat in and centered on the longitudinal axis of one of said members, a second concave spherical seat in and centered on the longitudinal axis of the other of said members and a ball disposed between and seated on said first and second spherical seats, the centre of said ball defining said point of intersection of said first longitudinal axis of said first member, said second longitudinal axis of said second member and the axis of said shank portions of said key members;
   a first cylindrical seat member, said first spherical seat being formed in one end of said first seat member, said first seat member being disposed in said inner cylindrical surface of said second member in close fit relation, and a concentric bore being formed in said first member, a second cylindrical seat member, said second spherical seat being formed in one end of said second seat member, said second seat member being disposed in said concentric bore of said first member in close fit relation therewith.

2. A universal joint assembly, comprising:

a first rotary member having a first longitudinal axis and an outer tubular portion at one end thereof concentrically disposed about said axis;

a second rotary member having a second longitudinal axis and an inner tubular portion at one end thereof concentrically disposed about said axis, said second member being adapted to be telescopically received within said outer tubular end portion of said first member;

bearing means for transmitting axial loads between said first and second members, said bearing means pivotally connecting said first and second members to provide limited omni-directional pivotal movement of one of said first and second members with respect to the other of said first and second members about a point of intersection of the longitudinal axes of said first and second members; and torque transfer means disposed between said outer and inner tubular end portion for transferring torque between said first and second members, said torque transfer means pivotally connecting said first and second members to provide limited omni-directional pivotal movement of one of said first and second members with respect to the other of said first and second members about a point of intersection of the longitudinal axes of said first and second members, said torque transfer means including longitudinal slots formed in one of said tubular end portions and keys extending from the other of said tubular end portions into torque transfer relation with said slots; said tubular end portion of said one of said members defining a chamber for reception of said tubular end portion of the other of said members, said chamber being adapted to be packed with lubricating fluid for lubricating moveable components disposed within said chamber, further including seal means engageable with said first and second members for retaining said lubricating fluid within said chamber, said seal means comprising, a ring member having an inner cylindrical surface, an opposed outer cylindrical surface and opposed annular end surfaces, one of said end surfaces being abuttingly engageable with an annular end surface of said tubular end portion of said first member, the other of said end surfaces of said ring member being engageable with retaining means secured to said first member, a first seal member disposed in said inner surface and engageable with said outer cylindrical surface of said second member in fluid sealing relating thereto, a second seal disposed in the other of said end surfaces and engageable with said retaining means in fluid sealing relation thereto;

means for equalizing the pressure between the interior and exterior of said assembly, said pressure equalizing means including a chamber in said inner member, one end of said chamber communicating with the interior of said assembly and the other end communicating with the exterior of said assembly, and sliding seal means sealingly engaged with surfaces of said chamber, said sliding seal means being moveable in said chamber in response to a pressure differential on opposite sides thereof to a position whereat the pressure differential is minimized.

3. A universal joint assembly, comprising:

a first rotary member having a first longitudinal axis and an outer tubular portion at one end thereof concentrically disposed about said axis;

a second rotary member having a second longitudinal axis and an inner tubular portion at one end thereof concentrically disposed about said axis, said second member being adapted to be telescopically received within said outer tubular end portion of said first member;

each said tubular end portion comprising a tubular wall defining an outer cylindrical surface and a concentric inner cylindrical surface;

bearing means for transmitting axial loads between said first and second members, said bearing means pivotally connecting said first and second members to provide limited omni-directional pivotal movement of one of said first and second members with respect to the other of said first and second members about a point of intersection of the longitudinal axes of said first and second members, said bearing means comprising a first concave spherical seat in and centered on the longitudinal axis of one of said members, a second concave spherical seat in and centered on the longitudinal axis of the other of said members and a ball disposed between and seated on said first and second spherical seats, the centre of said ball defining said point of intersection of said first longitudinal axis of said first member and said second longitudinal axis of said second members;

a first cylindrical seat member, said first spherical seat being formed in one end of said first seat member, said first seat member being disposed in said inner cylindrical surface of said second member in close fit relation, a concentric bore formed in said first member, a second cylindrical seat member, said second spherical seat being formed in one end of said second seat member, said second seat member being disposed in said concentric bore of said first member in close fit relation therewith; and torque transfer means disposed between said outer and inner tubular end portion for transferring torque between said first and second members, said torque transfer means pivotally connecting said first and second members to provide limited omni-directional pivotal movement of one of said first and second members with respect to the other of said first and second members about a point of intersection of the longitudinal axes of said first and second members, said torque transfer means including a plurality of equally angularly spaced longitudinal slots in said inner cylindrical surface of said outer tubular end portion of said first member, each said slot having a bottom surface and opposed side surfaces, and keys extending from the other of said tubular end portions into torque transfer relation with said slots, said keys being secured to said inner tubular end portion for pivotal movements about radial axes, each said key having a cylindrical shank portion adapted to be received in a radial bore in said inner tubular end portion and an elongated head portion extending transversely of said shank portion, each said head portion having a width which is substantially the same as that of said slots, said keys corresponding in number to the number of said slots and extending radially outwardly from said outer cylindrical surface of said inner tubular end portion of said second member, each said head portions having an arcuate surface remote from said shank portion arranged to be juxtaposed adjacent said bottom surface of an associated slot and opposed side surfaces abuttingly engageable in torque transfer relation with said opposed side surfaces of said associated slot, said head portion of each said key being longitudinally moveable in said associated slot in response to pivotal movement of said first and second members and said keys being operable to transfer torque between said first and second members;

said tubular end portion of said first rotary member defining a chamber for reception of said tubular end portion of said second rotary members, said chamber being packed with lubricating fluid for lubricating moveable components disposed within said chamber, further including seal means engageable with said first and second members for retaining said lubricating fluid within said chamber, said seal means comprising, a ring member having an inner cylindrical surface, an opposed outer cylindrical surface and opposed annular end surfaces, one of said end surfaces being abuttingly engageable with an annular end surface of said tubular end portion of said first member, the other of said end surfaces of said ring member being engageable with retaining means secured to said first member, a first seal member disposed in said inner surface and engageable with said outer cylindrical surface of said second member in fluid sealing relation thereto, a second seal disposed in the other of said end surfaces and engageable with said retaining means in fluid sealing relation thereto; and means for equalizing the pressure between the interior and exterior of said assembly, said pressure equalizing means including a chamber in said inner member, one end of said chamber communicating with the interior of said assembly and the other end communicating with the exterior of said assembly, and sliding seal means sealingly engaged with surfaces of said chamber, said sliding seal means being moveable in said chamber in response to a pressure differential on opposite sides thereof to a position whereat the pressure differential is minimized.

4. A universal joint assembly as defined in claim 2 or 3, said seal means comprising:
   a flexible sleeve member having a tubular body portion and an annular flange portion extending radially outwardly from one end of said body portion, said body portion being adapted to telescopingly receive said inner body member;
   clamp means for circumferentially and sealingly clamping the other end of said sleeve member against said inner member; and
   retaining means for sealingly clamping said annular flange portion against an annular surface of said first member.

5. A universal joint assembly as defined in claim 4, said retaining means having shoulder means engageable with an annular surface of said flange portion.

6. A universal joint assembly as defined in claim 5, said retaining means being tubular and adapted to be threaded engaged with said first member whereby to clamp said flange portion between said annular surface of said first member and said shoulder means.

7. A universal joint assembly as defined in claim 6, said flange portion having a concentric, conical seat portion and said shoulder means having a conical surface portion for mating sealing engagement with said conical seat portion of said flange portion.

8. A universal joint assembly as defined in claim 7, further including an annular ring member adapted to be interposed between said annular surface of said first member and said flange portion of said sleeve, said ring member having an axial extension adapted to be sealingly received within said tubular body portion, said extension having a conical seat portion engageable with said body portion.

* * * * *